United States Patent
Cypher et al.

(10) Patent No.: US 7,849,290 B2
(45) Date of Patent: Dec. 7, 2010

(54) STORE QUEUE ARCHITECTURE FOR A PROCESSOR THAT SUPPORTS SPECULATIVE EXECUTION

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 371 days.

(21) Appl. No.: 11/774,705

(22) Filed: Jul. 9, 2007

(65) Prior Publication Data

US 2009/0019272 A1    Jan. 15, 2009

(51) Int. Cl.
*G06F 9/30*    (2006.01)

(52) U.S. Cl. .................. 712/216; 712/218; 712/219

(58) Field of Classification Search .............. 712/216, 712/218, 219
See application file for complete search history.

(56) References Cited

U.S. PATENT DOCUMENTS

| | | | | |
|---|---|---|---|---|
| 5,185,871 A | * | 2/1993 | Frey et al. | 712/205 |
| 5,327,570 A | * | 7/1994 | Foster et al. | 712/30 |
| 5,551,001 A | * | 8/1996 | Cohen et al. | 711/122 |
| 5,592,684 A | * | 1/1997 | Gaskins et al. | 710/52 |
| 5,644,752 A | * | 7/1997 | Cohen et al. | 711/122 |
| 5,710,881 A | * | 1/1998 | Gupta et al. | 709/200 |
| 5,802,338 A | * | 9/1998 | Rechtschaffen et al. | 712/217 |
| 5,860,107 A | * | 1/1999 | Patel | 711/140 |
| 6,141,747 A | * | 10/2000 | Witt | 712/225 |
| 7,398,361 B2 | * | 7/2008 | Gunna et al. | 711/146 |
| 7,409,500 B2 | * | 8/2008 | Steely et al. | 711/119 |
| 7,412,555 B2 | * | 8/2008 | Wang | 710/310 |
| 2005/0154805 A1 | * | 7/2005 | Steely et al. | 710/52 |
| 2007/0050564 A1 | * | 3/2007 | Gunna et al. | 711/146 |
| 2008/0082793 A1 | * | 4/2008 | Yu et al. | 712/218 |
| 2008/0082794 A1 | * | 4/2008 | Yu et al. | 712/218 |
| 2008/0104326 A1 | * | 5/2008 | Cypher et al. | 711/122 |

* cited by examiner

*Primary Examiner*—Aimee J Li
(74) *Attorney, Agent, or Firm*—Park, Vaughan, Fleming & Dowler LLP; Anthony P. Jones

(57) ABSTRACT

Embodiments of the present invention provide a system that buffers stores on a processor that supports speculative execution. The system starts by buffering a store into an entry in the store queue during a speculative execution mode. If an entry for the store does not already exist in the store queue, the system writes the store into an available entry in the store queue and updates a byte mask for the entry. Otherwise, if an entry for the store already exists in the store queue, the system merges the store into the existing entry in the store queue and updates the byte mask for the entry to include information about the newly merged store. The system then forwards the data from the store queue to subsequent dependent loads.

29 Claims, 5 Drawing Sheets

STORE QUEUE ARCHITECTURE FOR A PROCESSOR THAT SUPPORTS SPECULATIVE EXECUTION

BACKGROUND

1. Field of the Invention

The present invention relates to designs for processors in computer systems. More specifically, the present invention relates to a store queue architecture for a processor that supports speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that microprocessor systems spend a large amount of time waiting for memory references to complete instead of performing computational operations.

Efficient caching schemes can help reduce the number of memory accesses that are performed. However, when a memory reference, such as a load, generates a cache miss, the subsequent access to level-two (L2) cache or memory can require dozens or hundreds of clock cycles to complete, during which time the processor is typically idle, performing no useful work.

In contrast, cache misses during stores typically do not have as much of an impact on performance because the processor usually places the stores into a "store queue" and continues executing subsequent instructions. Conventional store queue designs for in-order processors typically maintain an array of stores in program order, and provide circuitry to match every incoming load against the array of stores.

Unfortunately, designers have encountered limitations while using conventional store queue designs because each store is typically buffered to an individual store queue entry. In order to allow accesses to the individual store queue entries, the store queues typically provide circuitry to produce the most recent value of every byte in the store queue. This store queue circuitry must be able to determine the most recently buffered store to a given memory location from multiple buffered stores which can be directed to the same memory location.

In addition, because each store is buffered to an individual store queue entry, the memory system (i.e., the caches/memory and the supporting control circuitry) must provide sufficient bandwidth to eventually retire each store from the store queue.

Speculative execution is similarly limited by conventional program-order store queue designs. For example, typical program-order store queue designs do not support the buffering of loads and stores with unknown values or loads with unknown addresses (loads and stores of this nature are commonplace during speculative execution). In addition, conventional program-order store queue designs do not support the out-of-order re-execution of deferred loads or stores.

Hence, what is needed is a store queue design which does not suffer from the above-described problems.

SUMMARY

Embodiments of the present invention provide a system that buffers stores on a processor that supports speculative execution. The system starts by buffering a store of at least one byte into an entry in the store queue during a speculative execution mode. If a corresponding entry for the store does not already exist in the store queue, the system writes the at least one byte into a corresponding position in an available entry in the store queue and updates a byte mask for the available entry to indicate the position where the at least one byte was written. Otherwise, if the corresponding entry for the store already exists in the store queue, the system merges the at least one byte into the existing entry in the store queue by writing the at least one byte into a corresponding position in the entry in the store queue and updating the byte mask to indicate the position where any previous bytes were written and the position where the at least one byte was written. The system then forwards the at least one byte from the store queue to subsequent dependent loads.

In some embodiments, the speculative execution mode is an execute-ahead mode, wherein instructions that cannot be executed because of an unresolved data dependency are deferred and other non-deferred instructions are executed in program order, or a deferred mode, wherein deferred instructions are executed in program order and deferred instructions that still cannot be executed because of unresolved data dependencies are deferred again.

In some embodiments, if buffering the store involves buffering an unresolved data value, the system asserts an unknown value flag for the entry in the store queue. If any subsequently buffered store writes to all of the valid bytes in the entry in the store queue, the system de-asserts the unknown value flag. If any subsequently buffered store writes to less than all of the valid bytes in the entry in the store queue, the system aborts speculative-execution.

In some embodiments, while buffering an unresolved data value, the system buffers a store that has: a known data type, a known destination address, and an unknown data value caused by an unresolved data dependency.

In some embodiments, if a load depends on an entry in the store queue, and if the unknown value flag for the entry is asserted, the system defers the load.

In some embodiments, the system maintains an age counter. The system increments the age counter upon encountering at least one load with an unresolved address. When buffering a store, the system writes a current value of the age counter into an age field of the associated store queue entry. When deferring a load, the system writes a current value of the age counter into an age indicator for the deferred load.

In some embodiments, when a deferred load is re-executed in deferred mode, the system determines if the deferred load can be completed from an entry in the store queue. If so, the system reads the age field for the entry in the store queue to determine an age of the associated store and reads the age indicator for the deferred load to determine an age for the deferred load. If the deferred load has a larger age than the store, the system retrieves the value for the store from the entry in the store queue. Note that a deferred load has a larger age when the deferred load occurred after (i.e., later in program order) than the store which was buffered to the store queue.

In some embodiments, if the corresponding entry already exists in the store queue, the system determines if writing the at least one byte into the corresponding entry in the store queue involves overwriting previously written bytes. If so, and if an overwrite flag is not set for the corresponding entry in the store queue, the system copies the previous entry and the byte mask from the store queue to an entry and a byte mask in a first-overwritten buffer and sets the overwrite flag for the entry in the store queue. The system also defers the store.

In some embodiments, before commencing execution in deferred mode, the system writes each entry in the first-overwritten buffer into the corresponding entry in the store queue, which involves updating the data and byte mask for the corresponding entry in the store queue with the data and byte mask from the first overwritten buffer. The system also clears the overwrite flags.

In some embodiments, the system maintains an age counter, which is incremented upon encountering at least one load with an unresolved address. When buffering the store of at least one byte to the store queue, if the overwrite flag for the store queue entry is not asserted, the system writes the current value of the age counter into a first age field for the store queue entry. Alternatively, if the overwrite flag for the store queue entry is asserted, the system writes the current value of the age counter into a second age field for the store queue entry. When deferring a load, the system writes the current value of the age counter into an age indicator for the deferred load.

In some embodiments, when re-executing a deferred load in deferred mode, the system determines if the deferred load can be completed from an entry in the store queue. If so, the system reads the age indicator for the deferred load and compares the age of the deferred load to the first age field and the second age field of the store queue entry. If the age of the deferred load is less than the first age field and less than the second age field, the system completes the deferred load from a source other than the store queue. If the age of the deferred load is more than the first age field, but less than the second age field, the system aborts speculative execution. If the age of the deferred load is more than the first age field and more than the second age field, the system completes the deferred load from the entry in the store queue.

In some embodiments, when executing a load during speculative execution, the system performs a lookup in the store queue to look for an entry with a store that can satisfy the load. If such an entry is present in the store queue, the system returns the value and the byte mask of the entry. Otherwise, if the entry is not present in the store queue, the system returns a store queue miss signal.

In some embodiments, the store queue is a static random access memory (SRAM) based content addressable memory (CAM) which includes a number of entries, wherein each entry includes a data field and a key that is used to address the entry.

In some embodiments, the system store-marks a destination cache line for each buffered store. When a cache line is store-marked, no other thread can access the cache line. When speculative execution is subsequently completed or aborted, the system clears the store-mark from store-marked cache lines.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide an efficient architecture for implementing a processor's store queue when the processor uses checkpoint-based speculation ("speculative execution") to speculatively retire certain instructions while deferring other instructions (e.g., loads that miss in caches and instructions that are dependent on such loads). During speculative execution, deferred instructions are placed in a deferred queue and are executed at a later time (e.g., when data returns for a cache miss) by reading the deferred instructions from the deferred queue in program order and either speculatively retiring them or re-deferring them. Speculative execution is described in more detail in U.S. patent application Ser. No. 11/084,655, entitled "Generation of Multiple Checkpoints in a Processor that Supports Speculative Execution," by inventors Shailender Chaudhry, Marc Tremblay, and Paul Caprioli filed on Mar. 18, 2005, which is hereby incorporated by reference to describe speculative execution.

Computer System

Figure 1A:
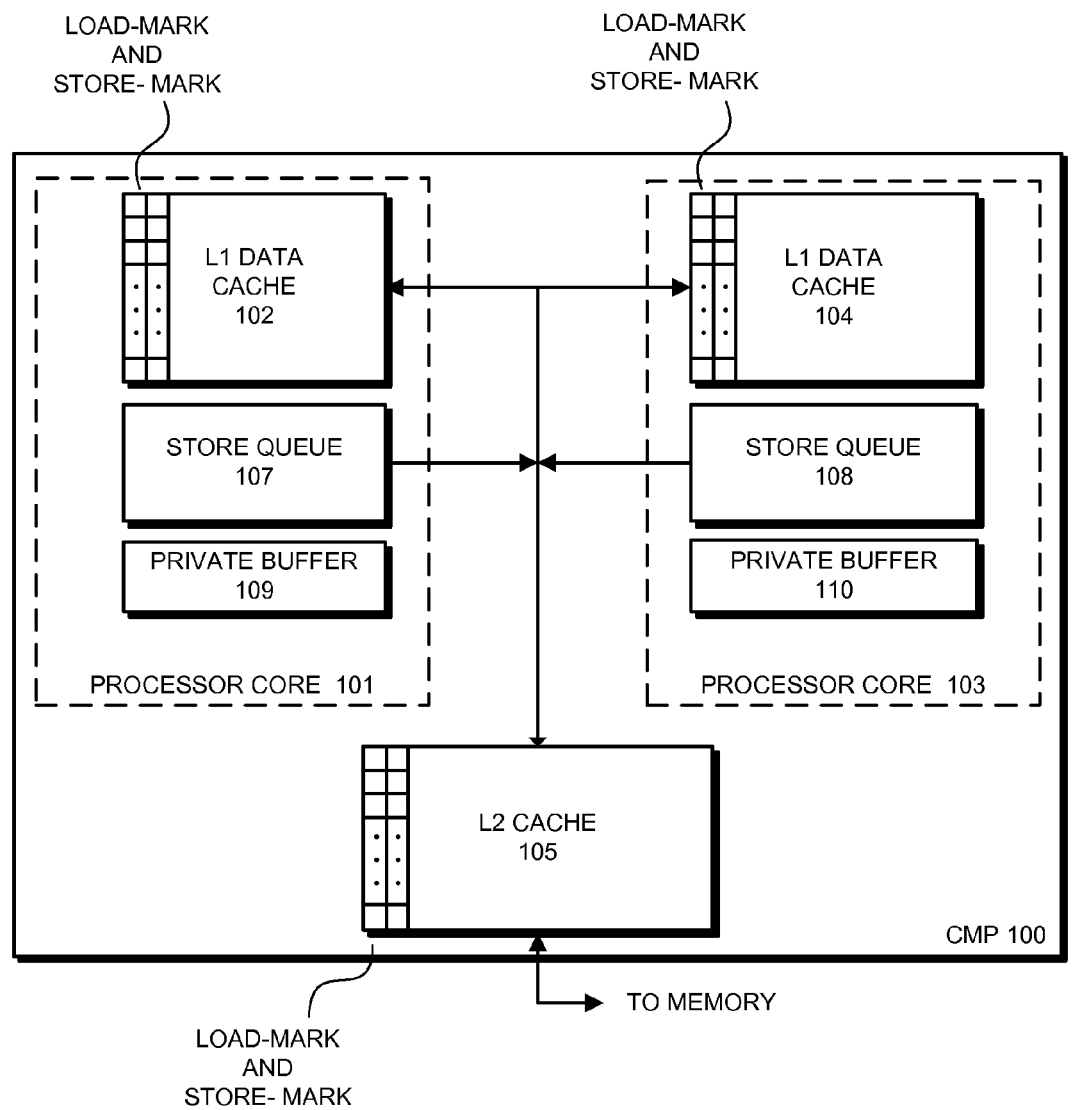
FIG. 1A illustrates an exemplary Chip Multi-Processor (CMP) system in accordance with embodiments of the present invention.

FIG. 1A illustrates an exemplary Chip Multi-Processor (CMP) system 100 in accordance with embodiments of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 performs a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 additionally include private buffers 109 and 110, which maintain copies of addresses of store-marked cache lines to facilitate efficient lookups of these addresses. When a thread needs to load from (or store to) a cache line, that thread first checks its private buffer to determine if the thread has already store-marked the cache line.

In addition, cache lines contained in L1 data caches 102 and 104, L2 cache 105, and in the memory (not shown) can include store-marks in metadata associated with the cache line. When a cache line is store-marked by a thread, the store-mark prevents another thread from loading the value from or storing a value to the cache line, thereby providing the store-marking thread with exclusive access to the cache line. We refer to the process of placing such marks on a cache line as "store-marking" the cache line. The process of store-marking cache lines is described in more detail in a pending U.S. patent application entitled "Preventing Store Starvation in a System that Supports Marked Coherence," having Ser. No. 11/700,703 and a filing date of Jan. 30, 2007, by inventors Robert E. Cypher and Shailender Chaudhry, and which is hereby incorporated by reference to describe store-marking.

In embodiments of the present invention, the system buffers stores from a thread to a corresponding store queue (such as store queue 107) during speculative-execution in order to avoid committing speculative stores to the architectural state of the processor. The buffered stores can then be bypassed to subsequent dependent instructions during speculative execution. In these embodiments, if the speculative execution episode fails and the system needs to return to a checkpoint, the speculative stores can be cleared from store queue 107. Otherwise, if the speculative execution episode ends successfully, the stores in store queue 107 can be committed to the architectural state of the processor.

Figure 1B:
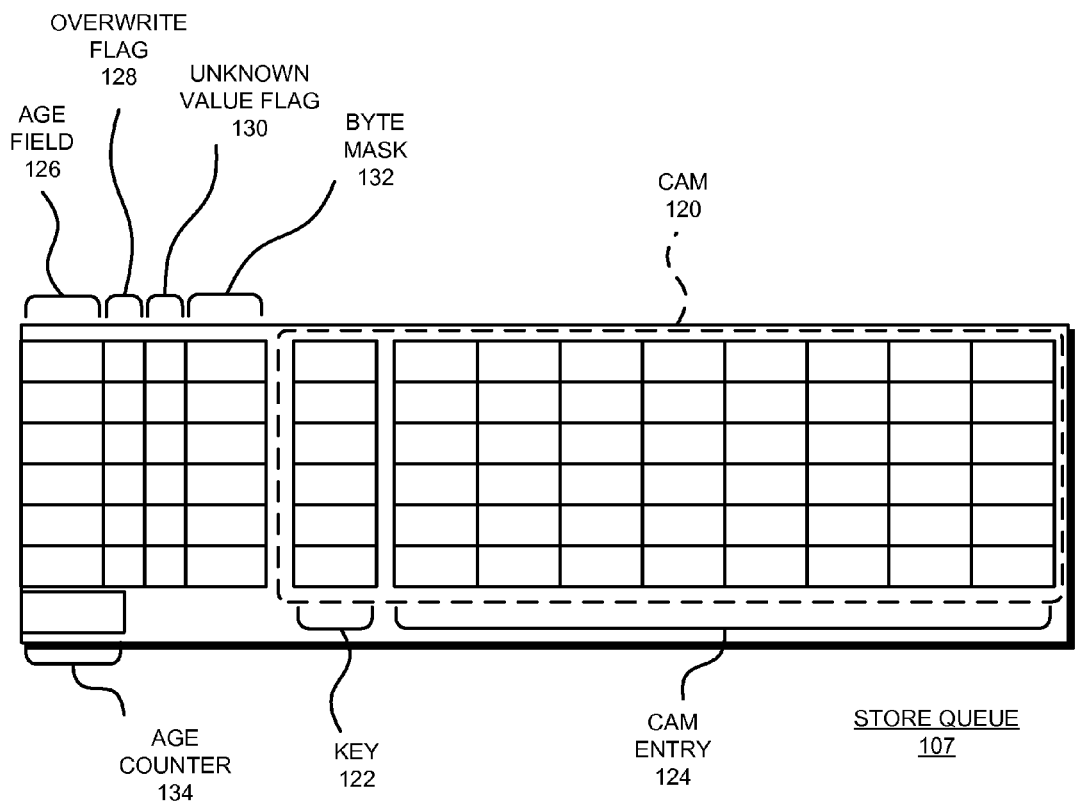
FIG. 1B illustrates an expanded view of a store queue in accordance with embodiments of the present invention.

Embodiments of the present invention implement store queues 107 and 108 using a content-addressable memory (CAM) 120 (see FIG. 1B). CAM 120 facilitates providing correct read-after-write (RAW) bypasses, even in the presence of loads and stores with unknown values and loads with unknown addresses. Some embodiments of the present invention use an area-efficient SRAM-based CAM to implement store queues 107 and 108. The design of an SRAM-based CAM is described in more detail in a pending U.S. patent application entitled "Content-Addressable Memory that Supports a Priority Ordering Between Banks," having Ser. No. 11/495,852 and a filing date of Jul. 27, 2006, and in a pending U.S. patent application entitled "Content-Addressable Memory that Supports a Priority Ordering Between Banks of Differing Sizes," having Ser. No. 11/495,451, and a filing date Jul. 27, 2006, both by inventor Robert E. Cypher, and which are hereby incorporated by reference to describe the design of an SRAM-based CAM.

Store Queue

FIG. 1B illustrates an expanded view of a store queue 107 in accordance with embodiments of the present invention. In embodiments of the present invention, store queue 107 maintains a CAM 120 of doubleword (DW) values, one for each DW that has been written by stores in the store queue. Specifically, whenever a store S to a DW D is added to the store queue, if no store in the store queue is directed to D, a new CAM entry 124 with key 122 generated from D and a value equal to the bytes written by S is added to CAM 120. Whenever a store S to a DW D is added to the store queue 107, if one or more prior stores to D have already been buffered in store queue 107, the CAM entry 124 for D is updated to show the cumulative effect of buffering the prior stores along with S (i.e., store S is "merged" with the earlier stores in CAM entry 124). Note that we describe CAM 120 as having doubleword-sized CAM entries 124 for the purposes of illustration. In alternative embodiments, CAM 120 can have larger- or smaller-sized entries.

Whenever the system checks the store queue for a buffered store to forward to a load, the system performs a lookup in CAM 120 for the buffered store. If the lookup hits in CAM 120, CAM 120 returns CAM entry 124 plus byte mask 132. On the other hand, if the lookup misses in CAM 120, CAM 120 returns a miss indicator.

Each CAM entry 124 has a key 122 that is used to address the CAM entry 124. When buffering a store, the system uses the original destination address of the DW containing the address of the store to generate key 122 and then buffers the store in the CAM entry 124 corresponding to the generated key 122. (Note that 8 separate single-byte store operations can potentially be associated with a given doubleword CAM entry 124, so more than one destination address can generate the same key 122.)

Each CAM entry 124 includes a byte mask 132, which the system uses to record which bytes within CAM entry 124 have had a store buffered to them. Byte mask 132 includes a bit for each byte within the corresponding CAM entry 124. When buffering a byte to a CAM entry 124, the system asserts a corresponding bit in byte mask 132. For example, if the system buffers a store into the first two bytes of a given CAM entry 124, the system asserts the first two bits of byte mask 132. When merging a later store into a CAM entry 124 that already holds one or more buffered stores, the system overwrites the previous byte values with the new byte values at each byte being stored to and logically ORs the previous byte mask 132 with new byte mask 132, thereby updating the information contained in byte mask 132.

During speculative execution, the system may encounter stores with unknown values. For example, a store with an unknown value occurs when the source register for the store is "not-there." In order to support stores with unknown values, there is an unknown value flag 130 associated with each entry in store queue 107. Unknown value flag 130 indicates if the values being stored are unknown. Initially, all unknown value flags 130 are clear. When a new CAM entry 124 is created for a store with an unknown value, the corresponding unknown value flag 130 is set (and the store is deferred). When a store with known value is performed to an entry with unknown value flag 130 set, the unknown value flag 130 is cleared if all of the valid bytes in the entry are being written to. Otherwise, the system fails speculative execution. During a CAM lookup, when a load hits on a CAM entry 124 with the unknown value flag 130 set, the load is deferred.

During speculative execution, the system may encounter loads to unknown (i.e., unresolved) destination addresses. For example, a load to an unknown address occurs when the system defers the instruction that computes the destination address for a subsequent load instruction. When a load to an unknown address occurs, the system defers the load (by placing the load into the deferred queue). In order to support the subsequent re-execution of deferred loads with unknown addresses, embodiments of the present invention maintain an age counter 134. Using age counter 134, the system can order the re-executed loads correctly with respect to stores in store queue 107.

In some embodiments of the present invention, the system increments age counter 134 every time the system defers a load with an unknown address during a speculative execution episode. In alternative embodiments, the system increments age counter 134 when a store follows one or more loads with unknown addresses during a speculative execution episode. Incrementing age counter 134 in this way allows the system to use the same age for two or more loads with unknown addresses when there are no intervening stores. Age counter 134 and the age fields 126 in store queue 107 are reset to zero (via a flash clear) when a speculative episode ends (due either to success or failure of the speculation).

During operation, when buffering a store to a CAM entry 124, the system writes the current value of age counter 134 into the corresponding age field 126. Hence, the entry in store queue 107 always has the age of the last buffered store in the entry (or is clear). In addition, when deferring a load or store into the deferred queue, the system records the current value of the age counter 134 within the deferred entry. Whenever a load with an unknown address is replayed, if the load hits in store queue 107 the system compares the age of the re-executed load and the value in the age field 126 of the CAM entry 124. If the CAM entry 124 has a smaller age value, the system uses the value of the CAM entry 124 as the value of the load. If the load has a smaller or equal age value, the system ignores the CAM entry 124 (i.e., the load is viewed as a store queue miss).

Embodiments of the present invention facilitate multiple stores to the same CAM entry 124 (i.e., the system may encounter multiple stores that are buffered to the same bytes within a given CAM entry 124). In order to support multiple stores to the same CAM entry 124 while also supporting the replaying (i.e., re-execution in deferred mode) of loads with unknown addresses, the system updates an overwrite flag 128 whenever a store overwrites a CAM entry 124 that is already present in store queue 107. In embodiments of the present invention, the system maintains one overwrite flag 128 per CAM entry 124. In these embodiments, overwrite flag 128 is asserted when any of the bytes in CAM entry 124 are overwritten. In alternative embodiments, the system maintains an overwrite flag 128 for each byte in CAM entry 124. In these embodiments, when a given byte is overwritten, the overwrite flag 128 for that byte is asserted.

Overwrite Flag

Figure 2:
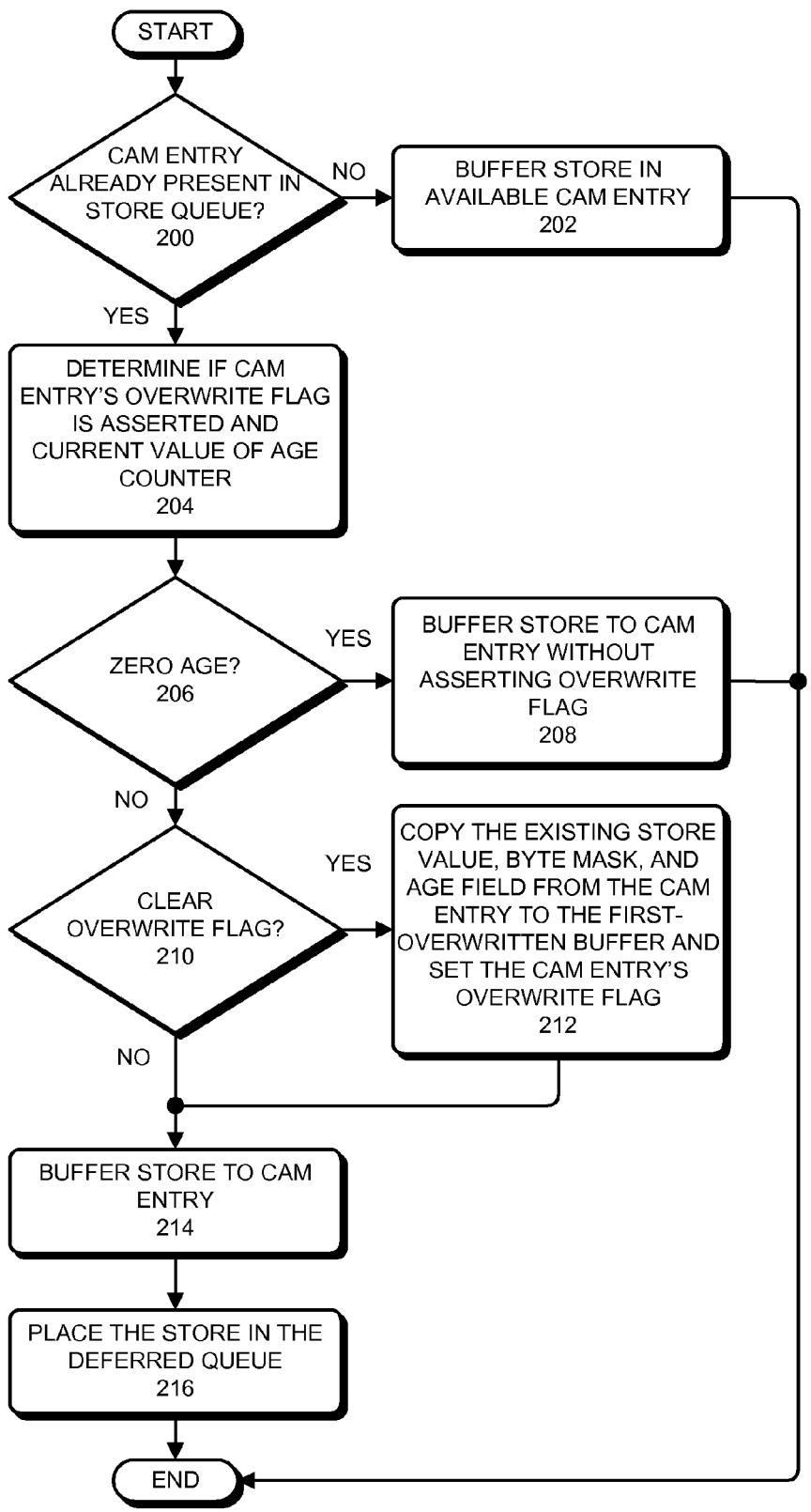
FIG. 2 presents a flowchart illustrating the process of using of an overwrite flag in accordance with embodiments of the present invention.

FIG. 2 presents a flowchart illustrating the process of using of an overwrite flag in accordance with embodiments of the present invention. During speculative execution, the system receives a store to a DW that is to be buffered to CAM 120. Next, the system determines if there is a CAM entry 124 already present in store queue 107 (step 200) corresponding to the DW. If not, the system buffers the store in an available CAM entry 124 (step 202). (When the store is buffered to an available CAM entry 124, the CAM entry's overwrite flag 128 is initially clear.) The system also updates the CAM entry 124's age field 126 with the current value of age counter 134.

If there exists a CAM entry 124 for the DW, the system determines whether the CAM entry's overwrite flag 128 is asserted and the current value of the age counter 134 (step 204). If the system determines that the store is directed to a DW which has a CAM entry 124, but that the current value of age counter 134 is zero (step 206, Yes), the system buffers (i.e., merges the new store into the existing CAM entry 124) the store to the CAM entry 124, but does not assert overwrite flag 128 (step 208).

On the other hand, if the system determines that the store is directed to a DW which has a CAM entry 124 with a clear overwrite flag (step 210, Yes) and that the current value of the age counter 134 is nonzero (step 206, No), the system performs several operations to update CAM entry 124. First, the system copies the existing CAM entry 124, and the CAM entry's byte mask 132 and age field 126 to a buffer (called the "first-overwritten buffer"), and sets the CAM entry's overwrite flag 128 (step 212). The system then buffers the store to the CAM entry 124 (step 214) (i.e., merges the later store into the existing CAM entry 124). The system also places the store in the deferred queue (step 216). Note that buffering the store may overwrite one or more bytes of the CAM entry 124.

Alternatively, if the system determines that the store is to a DW that has a CAM entry 124 with a non-clear overwrite flag and that the current value of the age counter 134 is nonzero (step 210, No), the system buffers the store to the CAM entry 124 (step 214) and places the store in the deferred queue (step 216). Note that buffering the store may overwrite one or more bytes of the CAM entry 124.

Immediately before executing instructions from the deferred queue (i.e., commencing operation in deferred mode) for each entry in the first-overwritten buffer, the system copies the entry and byte mask from the entry in the first-overwritten buffer to a corresponding CAM entry 124 and byte mask 132 in store queue 107. Also, the system writes the age field in the first-overwritten buffer into the corresponding age field 126 in store queue 107. The system then clears the overwrite flag 128. Then, during subsequent operation in deferred mode, re-executed stores from the deferred queue are used to update entries in the CAM 120 as described above (but the copying to the first-overwritten buffer does not take place).

Note that later stores to DWs with multiple stores are continually re-deferred (because these stores are re-executed during operation in deferred mode). When the deferred queue contains only such stores, a join operation can be performed, during which: the contents of the deferred queue can be deleted; the first-overwritten buffer can be cleared; and the speculatively retired instructions can be non-speculatively retired.

Dual Age Fields

Embodiments of the present invention include two age fields 126 corresponding to each CAM entry 124. The age fields 126 are used together to facilitate the overwriting of bytes in CAM entry 124 during speculative execution without deferring stores with nonzero ages that overwrite earlier entries. For the purposes of illustration, we call these age fields the "first age field" and the "last age field."

Figure 3:
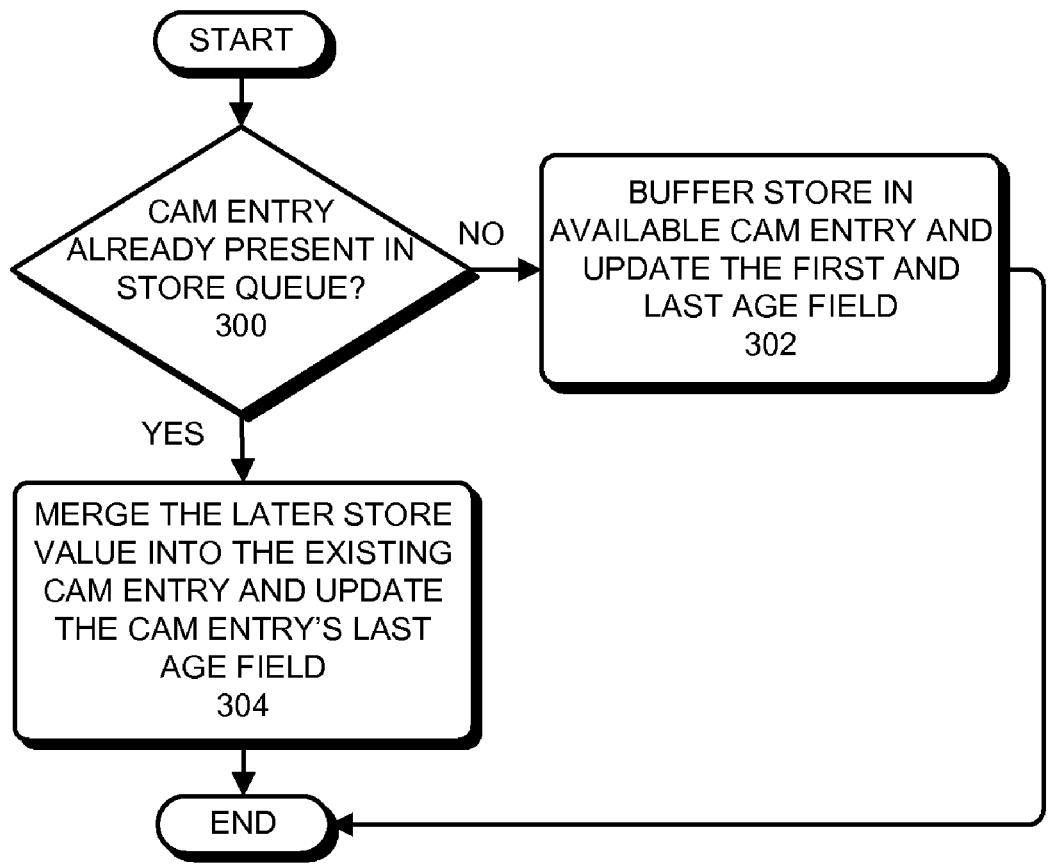
FIG. 3 presents a flowchart illustrating the process of updating two age fields during speculative execution in accordance with embodiments of the present invention.

FIG. 3 presents a flowchart illustrating the process of updating two age fields 126 during speculative execution in accordance with embodiments of the present invention. During speculative execution, the system receives a store to a DW that is to be buffered to CAM 120. The system then determines if there is a CAM entry 124 already present in store queue 107 (step 300) corresponding to the DW. If not, the system buffers the store in an available CAM entry 124 and updates the CAM entry's first and last age field (step 302) with the current value of age counter 134. (When the store is buffered to an available CAM entry 124, the CAM entry's overwrite flag 128 is initially clear.)

Otherwise, if there is a CAM entry 124 for the DW, the system merges the later store value into the existing CAM entry 124 and updates the CAM entry's last age field 126 (step 304) with the current value of age counter 134.

Along with buffering stores to store queue 107 during speculative execution, the system defers loads that have unresolved data dependencies (including storing the current value of age counter 134 along with the deferred load).

Figure 4:
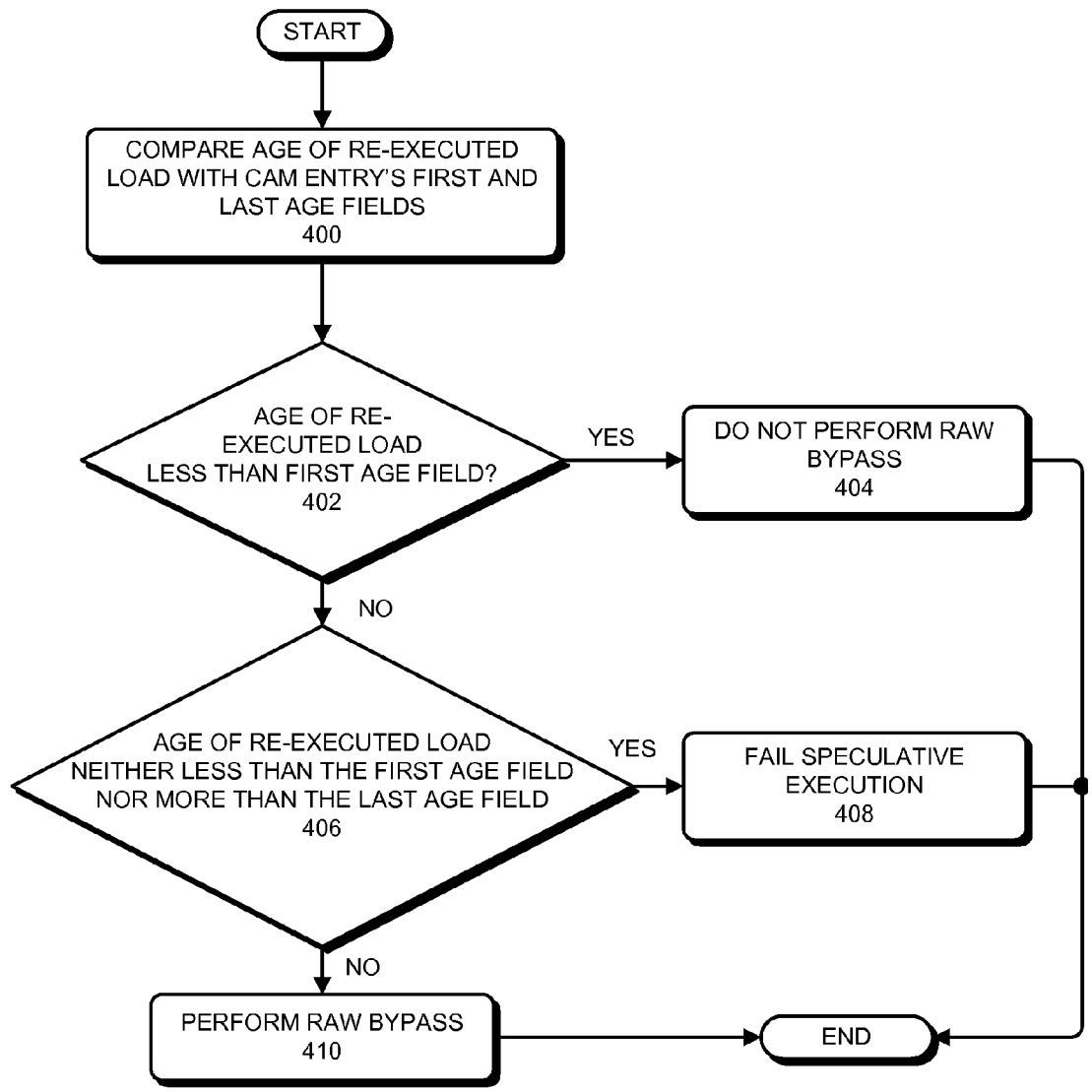
FIG. 4 presents a flowchart illustrating the comparison of ages during deferred mode in accordance with embodiments of the present invention.

FIG. 4 presents a flowchart illustrating the process of comparing ages during deferred mode in accordance with embodiments of the present invention. During deferred mode, the system performs a CAM lookup for re-executed loads in CAM 120. If the lookup hits in CAM 120, the system compares the re-executed load's age (which was deferred with the load) with the CAM entry's first age field 126 and last age field 126 (step 400). If the age of the re-executed load is less than or equal to the first age field 126 (step 402), the system does not perform a RAW bypass (step 404) and the re-executed load obtains its data from a cache or from memory. Alternatively, if the age of the re-executed load is neither less than or equal to the first age field nor more than the last age field (step 406) (i.e., the byte or bytes required by the load from CAM entry 124 may have been overwritten), the system fails speculative execution (step 408). Otherwise, if the age of the re-executed load is more than the last age (i.e., no stores have overwritten any value in the DW since the load was deferred), the system performs a RAW bypass (step 410).

Store Marking Cache Lines

Upon the completion of speculative execution, the store queue can be drained by removing entries from CAM 120 which contain updates from (non-speculatively) retired stores and applying them to the memory hierarchy. Draining the stores upon completion of speculative execution causes two problems in systems that support a memory model which requires that stores be applied to the memory in program order (such as the total store order (TSO) or sequential consistency (SC) memory models). First, because nonconsecutive stores can be merged in a CAM entry 124, the order in which the stores to one DW are applied to memory may not match program order. Second, because program order information is not maintained between separate CAM entries 124, the order in which stores to different DWs are applied to memory may not match program order. In order to adhere to the memory model while allowing stores to be applied to memory from store queue 107, embodiments of the present invention place store-marks on cache lines when the corresponding store is buffered into CAM 120.

Alternative Embodiments

Some embodiments of the present invention merge stores to a DW before writing to a CAM entry 124 in the store queue 107. In these embodiments, the system merges two or more stores before writing the stores to the CAM entry 124. Note that subsequent individual stores (or merged groups of stores) can still be merged into the CAM entry 124.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for buffering stores on a processor that supports speculative execution, comprising:
    buffering a store of at least one byte into an entry in a store queue during a speculative execution mode, wherein if a data value for the store is unknown because of an unresolved data dependency, buffering the store involves asserting an unknown value flag for the entry in the store queue, wherein the unknown value flag is de-asserted if any subsequently buffered store writes to the at least one byte in the entry;
    wherein if a corresponding entry for the store does not already exist in the store queue, buffering the store involves writing the at least one byte into a corresponding position in an available entry in the store queue and updating a byte mask for the available entry to indicate the position where the at least one byte was written; and
    wherein if the corresponding entry for the store already exists in the store queue, buffering the store involves merging the at least one byte into the existing entry in the store queue by writing the at least one byte into a corresponding position in the entry in the store queue and updating the byte mask to indicate the position where any previous bytes were written and the position where the at least one byte was written; and
    forwarding the at least one byte from the store queue to subsequent dependent loads.

2. The method of claim 1, wherein the speculative execution mode is:
    an execute-ahead mode, wherein instructions that cannot be executed because of an unresolved data dependency are deferred and other non-deferred instructions are executed in program order; or
    a deferred mode, wherein deferred instructions are executed in program order and deferred instructions that still cannot be executed because of unresolved data dependencies are deferred again.

3. The method of claim 2, wherein the method further comprises aborting speculative execution if any subsequently buffered store writes to less than all of the valid bytes in the entry in the store queue.

4. The method of claim 2, wherein buffering an unresolved data value involves buffering a store that has a known data type and a known destination address, but that has an unknown data value caused by an unresolved data dependency.

5. The method of claim 2, wherein if a load depends on an entry in the store queue, and if the unknown value flag for the entry is asserted, the method further comprises deferring the load.

6. The method of claim 2, wherein the method further comprises:
    maintaining an age counter, which involves incrementing the age counter upon encountering at least one load with an unresolved address;
    wherein buffering the store involves writing a current value of the age counter into an age field of the store queue entry; and
    wherein deferring a load involves writing a current value of the age counter into an age indicator for the deferred load.

7. The method of claim 6, wherein when a deferred load is re-executed in deferred mode, the method further comprises:
    determining if the deferred load can be completed from an entry in the store queue;
    if so, reading the age field for the entry to determine an age of the associated store and reading the age indicator for the deferred load to determine an age for the deferred load; and
    if the age of the deferred load is greater than the age of the store, retrieving the value for the load from the entry in the store queue.

8. The method of claim 2, wherein if the corresponding entry already exists in the store queue, the method further comprises:
    determining if writing the at least one byte into the corresponding entry in the store queue involves overwriting previously written bytes; and
    if so, and if an overwrite flag is not set for the corresponding entry in the store queue, copying the previous entry and the associated byte mask from the store queue to an entry and a byte mask in a first-overwritten buffer and setting the overwrite flag; and
    deferring the store.

9. The method of claim 8, wherein before commencing execution in deferred mode, the method further comprises writing each entry in the first-overwritten buffer into the corresponding entry in the store queue, including updating the byte mask for the corresponding entry in the store queue with the byte mask from the first overwritten buffer.

10. The method of claim 8, wherein the method further comprises:
maintaining an age counter, wherein maintaining the age counter involves incrementing the age counter upon encountering at least one load with an unresolved address;
wherein buffering the store involves writing a current value of the age counter into a first age field for the store queue entry if the overwrite flag for the store queue entry is not asserted, and writing a current value of the age counter into a second age field for the store queue entry if the overwrite flag for the store queue entry is asserted; and
wherein deferring a load involves writing a current value of the age counter into an age indicator for the deferred load.

11. The method of claim 10, wherein when a deferred load is re-executed in deferred mode, the method further comprises:
determining if the deferred load can be completed from an entry in the store queue;
if so, reading the age indicator for the deferred load to determine an age for the deferred load and comparing the age of the deferred load to the first age field and the second age field of the store queue entry;
wherein if the age of the deferred load is less than the first age field and less than the second age field or equal to the first age field, the method further comprises completing the deferred load from a source other than the store queue;
wherein if the age of the deferred load is more than the first age field, but less than the second age field or equal to the second age field, the method further comprises aborting speculative execution; and
wherein if the age of the deferred load is more than the first age field and more than the second age field, the method further comprises completing the deferred load from the entry in the store queue.

12. The method of claim 2, wherein when a load is executed during operation in the speculative execution mode, the method further comprises: performing a lookup in the store queue to look for an entry that contains a store that can satisfy the load;
if such an entry is present in the store queue, returning the value and the byte mask of the entry; or
if such an entry is not present in the store queue, returning a store queue miss signal.

13. The method of claim 2, wherein the store queue is a static random access memory (SRAM) based content addressable memory (CAM) that includes a number of entries, wherein each entry includes a data field and a key that is used to address the entry.

14. The method of claim 2, wherein the method further comprises:
store-marking a destination cache line for each buffered store, wherein when a cache line is store-marked, no other thread can access the cache line; and
clearing the store-mark from the store-marked cache lines when speculative execution is completed or aborted.

15. An apparatus for buffering stores on a processor that supports speculative execution, comprising:
a processor;
an execution mechanism in the processor;
a store queue in the processor;
wherein the execution mechanism is configured to buffer a store of at least one byte into an entry in the store queue during a speculative execution mode, wherein if a data value for the store is unknown because of an unresolved data dependency, the execution mechanism is configured to assert an unknown value flag for the entry in the store queue, wherein the unknown value flag is de-asserted if any subsequently buffered store writes to the at least one byte in the entry;
wherein if a corresponding entry for the store does not already exist in the store queue, the execution mechanism is configured to buffer the store by writing the at least one byte into a corresponding position in an available entry in the store queue and updating a byte mask for the available entry to indicate the position where the at least one byte was written; and
wherein if the corresponding entry for the store already exists in the store queue, the execution mechanism is configured to buffer the store by merging the at least one byte into the existing entry in the store queue, wherein merging the at least one byte involves writing the at least one byte into a corresponding position in the entry in the store queue and updating the byte mask to indicate the position where any previous bytes were written and the position where the at least one byte was written; and
the execution mechanism is configured to forward the at least one byte from the store queue to subsequent dependent loads.

16. The apparatus of claim 15, wherein the execution mechanism is configured so that the speculative execution mode is:
an execute-ahead mode, wherein instructions that cannot be executed because of an unresolved data dependency are deferred and other non-deferred instructions are executed in program order; or
a deferred mode, wherein deferred instructions are executed in program order and deferred instructions that still cannot be executed because of unresolved data dependencies are deferred again.

17. The apparatus of claim 16, wherein the execution mechanism is configured to abort speculative execution if any subsequently buffered store writes to less than all of the valid bytes in the entry in the store queue.

18. The apparatus of claim 16, wherein the execution mechanism is configured so that buffering an unresolved data value involves buffering a store that has a known data type and a known destination address, but that has an unknown data value caused by an unresolved data dependency.

19. The apparatus of claim 16, wherein if a load depends on an entry in the store queue, and if the unknown value flag for the entry is asserted, the execution mechanism is configured to defer the load.

20. The apparatus of claim 16, wherein the execution mechanism is configured to:
maintain an age counter, which involves incrementing the age counter upon encountering at least one load with an unresolved address;
wherein when buffering the store, the execution mechanism is configured to write a current value of the age counter into an age field of the store queue entry; and
wherein when deferring a load, the execution mechanism is configured to write a current value of the age counter into an age indicator for the deferred load.

21. The apparatus of claim 20, wherein when a deferred load is re-executed in deferred mode, the execution mechanism is configured to:
   determine if the deferred load can be completed from an entry in the store queue;
   if so, the execution mechanism is configured to read the age field for the entry to determine an age of the associated store and read the age indicator for the deferred load to determine an age for the deferred load; and
   if the age of the deferred load is greater than the age of the store, the execution mechanism is configured to retrieve the value for the load from the entry in the store queue.

22. The apparatus of claim 16, wherein if the corresponding entry already exists in the store queue, the execution mechanism is configured to:
   determine if writing the at least one byte into the corresponding entry in the store queue involves overwriting previously written bytes; and
   if so, and if an overwrite flag is not set for the corresponding entry in the store queue, the execution mechanism is configured to copy the previous entry and the associated byte mask from the store queue to an entry and a byte mask in a first-overwritten buffer and set the overwrite flag; and
   the execution mechanism is configured to defer the store.

23. The apparatus of claim 22, wherein before commencing execution in deferred mode, the execution mechanism is configured to write each entry in the first-overwritten buffer into the corresponding entry in the store queue, including updating the byte mask for the corresponding entry in the store queue with the byte mask from the first overwritten buffer.

24. The apparatus of claim 22, wherein the execution mechanism is configured to:
   maintain an age counter, wherein when maintaining the age counter, the execution mechanism is configured to increment the age counter upon encountering at least one load with an unresolved address;
   wherein when buffering the store, the execution mechanism is configured to write a current value of the age counter into a first age field for the store queue entry if the overwrite flag for the store queue entry is not asserted, and write a current value of the age counter into a second age field for the store queue entry if the overwrite flag for the store queue entry is asserted; and
   wherein when deferring a load, the execution mechanism is configured to write a current value of the age counter into an age indicator for the deferred load.

25. The apparatus of claim 24, wherein when a deferred load is re-executed in deferred mode, the execution mechanism is configured to:
   determine if the deferred load can be completed from an entry in the store queue;
   if so, the execution mechanism is configured to read the age indicator for the deferred load to determine an age for the deferred load and compare the age of the deferred load to the first age field and the second age field of the store queue entry;
   wherein if the age of the deferred load is less than the first age field and less than the second age field or equal to the first age field, the execution mechanism is configured to complete the deferred load from a source other than the store queue;
   wherein if the age of the deferred load is more than the first age field, but less than the second age field or equal to the second age field, the execution mechanism is configured to abort speculative execution; and
   wherein if the age of the deferred load is more than the first age field and more than the second age field, the execution mechanism is configured to complete the deferred load from the entry in the store queue.

26. The apparatus of claim 16, wherein when a load is executed during operation in the speculative execution mode, the execution mechanism is configured to:
   perform a lookup in the store queue to look for an entry that contains a store that can satisfy the load;
   if such an entry is present in the store queue, the store queue is configured to return the value and the byte mask of the entry; or
   if such an entry is not present in the store queue, the store queue is configured to return a store queue miss signal.

27. The apparatus of claim 16, wherein the store queue is a static random access memory (SRAM) based content addressable memory (CAM) that includes a number of entries, wherein each entry includes a data field and a key that is used to address the entry.

28. The apparatus of claim 16, wherein the execution mechanism is configured to store-mark a destination cache line for each buffered store, wherein when a cache line is store-marked, no other thread can access the cache line; and
   the execution mechanism is configured to clear the store-mark from the store-marked cache lines when speculative execution is completed or aborted.

29. A method for buffering stores on a processor that supports speculative execution, comprising:
   buffering a store of at least one byte into an entry in a store queue during a speculative execution mode;
   wherein if a corresponding entry for the store does not already exist in the store queue, buffering the store involves writing the at least one byte into a corresponding position in an available entry in the store queue and updating a byte mask for the available entry to indicate the position where the at least one byte was written; and
   wherein if the corresponding entry for the store already exists in the store queue, buffering the store involves merging the at least one byte into the existing entry in the store queue by writing the at least one byte into a corresponding position in the existing entry in the store queue, overwriting any previous byte values with the new byte values at each byte being stored, and updating the byte mask to indicate the position where any previous bytes were written and the position where the at least one byte was written, wherein at the end of the merging operation the single existing entry in the store queue contains one or more bytes from at least two separate stores; and
   forwarding the at least one byte from the store queue to subsequent dependent loads.

* * * * *